(12) United States Patent
Myers

(10) Patent No.: US 8,283,904 B2
(45) Date of Patent: Oct. 9, 2012

(54) CIRCUITRY FOR SUPPLYING ELECTRICAL POWER TO LOADS

(75) Inventor: Peter Jay Myers, Raleigh, NC (US)

(73) Assignee: Cree, Inc., Durham, NC (US)

( * ) Notice: Subject to any disclaimer, the term of this patent is extended or adjusted under 35 U.S.C. 154(b) by 270 days.

(21) Appl. No.: 11/854,744

(22) Filed: Sep. 13, 2007

(65) Prior Publication Data

US 2008/0088248 A1    Apr. 17, 2008

Related U.S. Application Data

(60) Provisional application No. 60/844,325, filed on Sep. 13, 2006.

(51) Int. Cl.
 *H02M 3/335* (2006.01)
 *G05F 1/577* (2006.01)
(52) U.S. Cl. ..................... 323/267; 363/21.12
(58) Field of Classification Search ............... 323/225, 323/267, 268, 271; 363/21.12
See application file for complete search history.

(56) References Cited

U.S. PATENT DOCUMENTS

| | | | |
|---|---|---|---|
| 4,301,497 A * | 11/1981 | Johari | 363/21.12 |
| 4,859,911 A | 8/1989 | Kinnard et al. | |
| 4,945,465 A * | 7/1990 | Marinus et al. | 363/89 |
| 4,988,889 A | 1/1991 | Oughton, Jr. | |
| 5,225,767 A * | 7/1993 | Gulczynski | 323/282 |
| 5,455,501 A * | 10/1995 | Massie | 323/267 |
| 5,661,645 A | 8/1997 | Hochstein | |
| 5,812,105 A | 9/1998 | Van de Ven | |
| 5,973,483 A | 10/1999 | Jo | |
| 6,051,935 A | 4/2000 | Bucks et al. | |
| 6,150,771 A | 11/2000 | Perry | |
| 6,153,985 A | 11/2000 | Grossman | |
| 6,161,910 A | 12/2000 | Reisenauer et al. | |
| 6,181,114 B1 * | 1/2001 | Hemena et al. | 323/222 |
| 6,285,139 B1 | 9/2001 | Ghanem | |

(Continued)

FOREIGN PATENT DOCUMENTS

EP       1 033 903       9/2000

(Continued)

OTHER PUBLICATIONS

In-Plug® series: IPS401, "High Efficiency, High Power Factor, Universal High Brightness WHITE LED Controller", ASIC Advantage Inc.

(Continued)

*Primary Examiner* — Gary L Laxton
(74) *Attorney, Agent, or Firm* — Burr & Brown

(57) ABSTRACT

A power supply, comprising a boost converter which provides voltage to a first load, and a flyback converter which provides voltage to a second load and which utilizes an inductive element of the boost converter as a primary winding of a transformer of the flyback converter. Also, a power supply comprising a MOSFET which is disposed between solid state elements and a second reference potential and which controls current flowing through the solid state elements. Also, a circuit comprising a transformer, a first circuit portion comprising the primary winding of the transformer and a second circuit portion comprising the secondary winding of the transformer. Also, a power supply comprising means for using a common transformer for providing a boost converter and a flyback converter. Also, a power supply comprising a transformer, means for providing a boost converter utilizing the transformer, and means for providing a flyback converter utilizing the transformer.

19 Claims, 3 Drawing Sheets

U.S. PATENT DOCUMENTS

| | | |
|---|---|---|
| 6,329,760 B1 | 12/2001 | Bebenroth |
| 6,359,392 B1 | 3/2002 | He |
| 6,362,578 B1 | 3/2002 | Swanson et al. |
| 6,441,558 B1 | 8/2002 | Muthu et al. |
| 6,459,919 B1 | 10/2002 | Lys et al. |
| 6,510,995 B2 | 1/2003 | Muthu et al. |
| 6,577,512 B2 | 6/2003 | Tripathi et al. |
| 6,586,890 B2 | 7/2003 | Min et al. |
| 6,618,031 B1 | 9/2003 | Bohn, Jr. et al. |
| 6,819,575 B1 * | 11/2004 | Batarseh et al. ........... 363/21.12 |
| 7,015,654 B1 * | 3/2006 | Kuhlmann et al. ........... 315/291 |
| 7,276,861 B1 | 10/2007 | Shteynberg et al. |
| 7,301,288 B2 | 11/2007 | Green |
| 7,323,828 B2 | 1/2008 | Russell et al. |
| 2001/0024112 A1 | 9/2001 | Jacobs et al. |
| 2002/0145392 A1 | 10/2002 | Hair, III et al. |
| 2005/0035728 A1 | 2/2005 | Schanberger et al. |
| 2006/0139954 A1 | 6/2006 | Kobori et al. |
| 2006/0176411 A1 | 8/2006 | Furukawa |
| 2007/0115248 A1 | 5/2007 | Roberts et al. |
| 2008/0278097 A1 | 11/2008 | Roberts et al. |

FOREIGN PATENT DOCUMENTS

| | | |
|---|---|---|
| GB | 2 249 840 | 5/1992 |
| JP | 10-233669 | 9/1998 |
| WO | 01/63977 | 8/2001 |
| WO | 2004/060023 | 7/2004 |

OTHER PUBLICATIONS

Perduijn, "Light Output Feedback Solution for RGB LED Backlight Applications".

U.S. Appl. No. 12/411,905, filed Mar. 26, 2009, Antony Paul Van De Ven.

* cited by examiner

CIRCUITRY FOR SUPPLYING ELECTRICAL POWER TO LOADS

CROSS-REFERENCE TO RELATED APPLICATIONS

This application claims the benefit of U.S. Provisional Patent Application No. 60/844,325, filed Sep. 13, 2006, the entirety of which is incorporated herein by reference.

FIELD OF THE INVENTION

The present invention relates to circuitry for supplying electrical power to one or more loads. In some aspects, the present invention relates to circuitry for supplying electrical power to drive one or more solid state light emitting elements, e.g., LEDs.

BACKGROUND OF THE INVENTION

Types of conventional switching mode power supplies include a boost converter topology and a flyback converter topology. A conventional boost converter topology is illustrated in FIG. 1. A boost converter is a power converter which provides an output voltage that is greater than its input voltage (i.e. $V_L > V_{in}$). The boost converter depicted in FIG. 1 includes an energy storage element, such as the inductor L1, a switching element S1, a flyback diode D1 and a capacitor C1. The output may also be filtered to improve performance.

In operation, the boost converter depicted in FIG. 1 operates in two states, when the switch S1 is on (closed) and when the switch S1 is off (open). When the switch S1 is closed, increased current flows through the inductor L1. When the switch S1 opens, the only path to the increased current is through the diode D1 to the capacitor C1 and the load. This release of energy stored in the inductor L1 results in an increased output voltage. In the idealized circuit, the ratio of the output voltage to the input voltage is 1/(1−D) where D is the duty cycle (0≦D<1) of the switching of switch S1. Thus, the output voltage of the boost converter will be greater than the input voltage. Additional details on the operation of a boost converter topology may be found at en.wikipedia.org/wiki/Boost_converter.

A conventional flyback converter topology is illustrated in FIG. 2. A flyback converter uses a transformer to isolate the input from the output. The voltage $V_{in}$ is imposed on the output of the transformer T1 according to the turns ratio. When the switch S2 is closed, current flows through the primary side of the transformer T1 but the diode D2 blocks current from flowing through the secondary winding of the transformer T1, increasing the magnetic flux in the transformer T1. Current to the load is supplied by the capacitor C1. When the switch S1 is open, the energy stored in the transformer T1 is supplied through the diode D2 to the capacitor C1 and the load. Additional details on the operation of a flyback converter topology may be found at en.wikipedia.org/wiki/Flyback_converter. An example of a flyback power converter driving strings of light emitting diodes (LEDs) is illustrated in U.S. Pat. No. 6,285,139 to Ghanem.

While boost converter power supplies and flyback converter power supplies could be used to drive a solid state light emitting device as the load, where multiple solid state light emitting devices of different types or different string lengths are employed, such power supplies are not capable of applying different voltages to different types of solid state light emitting devices and/or different string lengths. Where different types of solid state light emitting devices and/or different string lengths are employed, supplying different voltages would provide improved efficiency. See e.g., U.S. Pat. No. 5,812,105 to Van de Ven.

Another difficulty with driving light emitting devices, such as light emitting diodes, relates to current control of the devices. Conventional LED driver circuits have used current regulating bipolar transistors between the strings of LEDs and ground to control current through a string of LEDs. See e.g., U.S. Pat. No. 6,161,910 to Reisenauer et al. Conventional LED driver circuits have also used metal-oxide-semiconductor field effect transistors (MOSFETs) between the strings of LEDs and ground in combination with a pulse width modulated control signal to the MOSFETs to control current through a string of LEDs. See e.g., U.S. Pat. No. 6,362,578 to Swanson et al.

BRIEF SUMMARY OF THE INVENTION

In accordance with several of the aspects of the present invention, described below, there is provided novel power supply circuitry in which a flyback converter topology is combined with a boost converter topology such that the flyback converter utilizes an inductive element of the boost converter as a primary winding of a transformer of the flyback converter. In some embodiments of the invention, the boost converter is configured to provide a voltage higher than an input voltage to a first string of light emitting elements, and the flyback converter is configured to provide a voltage to a second string of light emitting elements.

The boost/flyback arrangement makes it possible to use the boost topology for a switch mode power supply to create output voltages above input line peak, while the flyback winding simultaneously creates an output voltage below input line peak. A regulated output substantially below line peak is difficult, if not impossible, to achieve with a pure boost topology. A flyback topology would mean a large number of secondary turns (relative to primary) to achieve a voltage above input line peak, which may be costly, consume space, and increase losses. Accordingly, a combination boost/flyback topology is provided. A second winding, electrically isolated from the primary boost winding is constructed on the transformer bobbin. The number of turns of this winding is less than the number of turns of the primary boost winding, resulting in a lower output voltage at load. The combination of boost winding and secondary winding represents a unique combination.

In some embodiments according to these aspects of the present invention, the inductive element of the boost converter is coupled to the input voltage, and the boost converter further comprises a diode coupled between the inductive element and the string of light emitting elements, and a switching element coupled between the inductive element and a reference voltage, and the flyback converter comprises:

a secondary winding configured to be coupled to the primary winding;

a diode coupled between the secondary winding and a second string of light emitting elements; and a capacitive element coupled to the diode and in parallel to the second string of light emitting elements.

In some of such embodiments, the power supply further comprises a control circuit configured to control the switching element to provide a predefined frequency and duty cycle with which the switching element is opened and closed.

According to a second aspect of the present invention, there is provided a power supply for driving solid state light emitting elements, the solid state elements being coupled between a first reference potential and a second reference potential, the power supply comprising:

a metal-oxide semiconductor field effect transistor (MOSFET) disposed between the solid state elements and the second reference potential, the MOSFET being configured to control the level of current flowing through the solid state elements.

Low-side MOSFET regulation allows the use of low-voltage control circuits for the MOSFET gate. The allowable voltage differential between a MOSFET gate and the signal common terminal is typically small (e.g., plus or minus 20 volts or less).

According to a third aspect of the present invention, there is provided a circuit for supplying power, comprising at least a first transformer, a first circuit portion and a second circuit portion.

In the third aspect of the present invention, the first circuit portion comprises the primary winding of the first transformer, at least a first switch and a first sub-circuit, with the first switch and the first sub-circuit being arranged in parallel. The first sub-circuit comprises at least a first diode and a second sub-circuit, the first diode and the second sub-circuit being arranged in series. The second sub-circuit comprises at least a first capacitor and at least a first load arranged in parallel.

In the third aspect of the present invention, the second circuit portion comprises the secondary winding of the first transformer, at least a second diode and a third sub-circuit, the second diode and the third sub-circuit being arranged in series. The third sub-circuit comprises at least a second capacitor and at least a second load arranged in parallel. The primary winding and a sub-circuit including the first switch and the first sub-circuit are arranged in series. The secondary winding and a sub-circuit including the second diode and the third sub-circuit are arranged in series.

In some embodiments according to this aspect of the present invention, the second sub-circuit is electrically connected to a cathode end of the first diode.

In some embodiments according to this aspect of the present invention, the second capacitor is electrically connected to a cathode end of the third sub-circuit.

In some embodiments according to this aspect of the present invention, the third sub-circuit is electrically connected to a cathode end of the second diode.

In some embodiments according to this aspect of the present invention, the first switch is a MOSFET.

In some embodiments according to this aspect of the present invention, voltage applied to the first load is based on a duty cycle of the first switch.

In some embodiments according to this aspect of the present invention, the second circuit portion further comprises at least a third diode electrically connected between a first node and a second node, the first node being between a first end of the secondary winding of the first transformer and the anode end of the second diode, the second node being between the cathode end of the third sub-circuit and a second end of the secondary winding of the first transformer. In some of such embodiments, the second circuit portion further comprises at least a third capacitor electrically connected between the second end of the secondary winding of the first transformer and a node which is electrically connected to a cathode end of the third sub-circuit and to a cathode end of the third diode.

In some embodiments according to this aspect of the present invention, the second circuit portion further comprises at least a third capacitor electrically connected between a cathode end of the third sub-circuit and the second end of the secondary winding of the first transformer.

In some embodiments according to this aspect of the present invention, at least one of the first load and the second load comprises at least a first solid state light emitting element. In some of such embodiments, the first solid state light emitting element is an LED.

In some embodiments according to this aspect of the present invention:

at least one of the first load and the second load comprises at least a first solid state light emitting element, at least a first transistor, at least a first resistor and at least a first operational amplifier, the first solid state light emitting element, the first transistor, and the first resistor are arranged in series, a cathode end of the first solid state light emitting element is electrically connected to a source of the first transistor, the first resistor is electrically connected to a collector of the first transistor, and the operational amplifier drives a gate voltage of the first transistor, a reference voltage is provided as a first input to the operation amplifier and a voltage from a node between the collector of the first transistor and the first resistor is a second input to the operational amplifier.

In some embodiments according to this aspect of the present invention, a first voltage applied to the first load differs from a second voltage applied to the second load. In some of such embodiments, the first voltage is applied to the first load simultaneously with the second voltage being applied to the second load.

The invention may be more fully understood with reference to the accompanying drawings and the following detailed description of the invention.

BRIEF DESCRIPTION OF THE DRAWING FIGURES

DETAILED DESCRIPTION OF THE INVENTION

Figure 1:
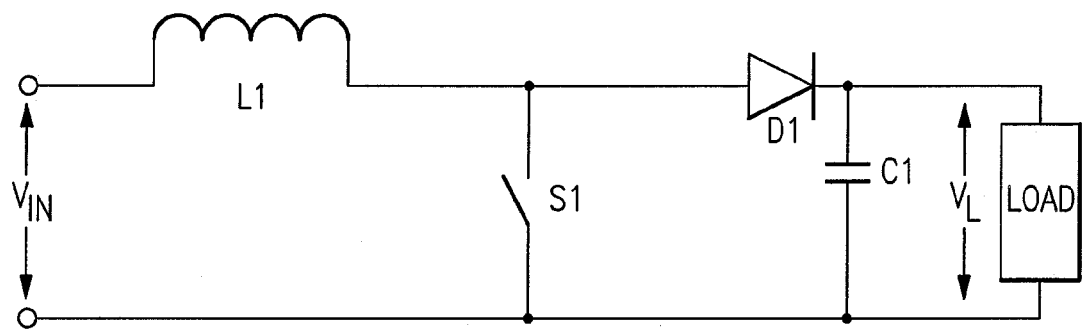
FIG. 1 is a schematic diagram of a conventional boost converter circuit.
Figure 2:
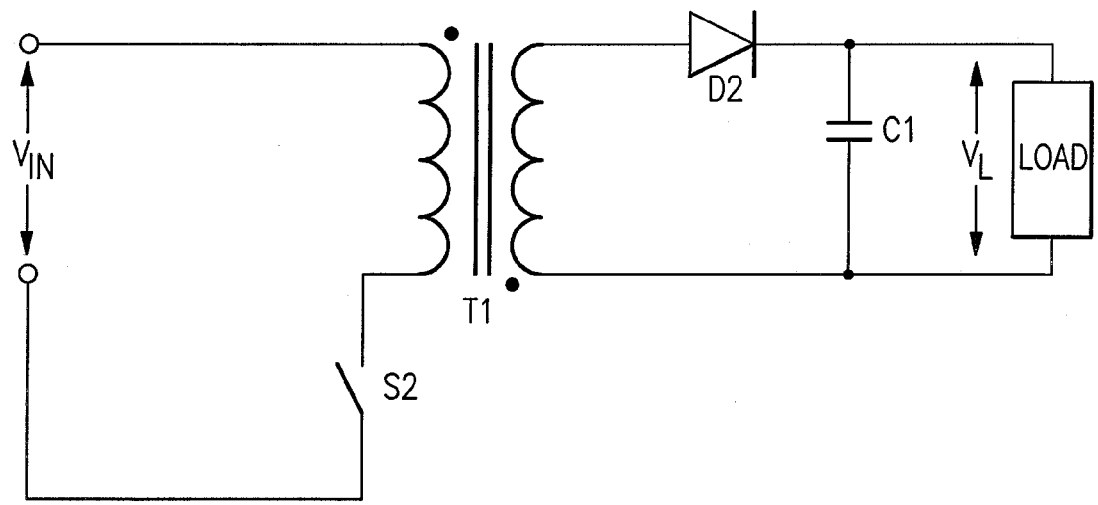
FIG. 2 is a schematic diagram of a conventional flyback converter circuit.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As noted above, the various aspects of the present invention include various combinations of electronic components (transformers, switches, diodes, capacitors, transistors, etc.). Persons skilled in the art are familiar with and have access to a wide variety of such components, and any of such components can be used in making the devices according to the present invention. In addition, persons skilled in the art are able to select suitable components from among the various choices based on requirements of the loads and the selection of other components in the circuitry.

A statement herein that two components in a device are "electrically connected," means that there are no components electrically between the components, the insertion of which materially affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board or another medium, are electrically connected.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, FIG. 3 is a schematic diagram of a boost/flyback power supply according to some embodiments of the present invention.

Figure 3:
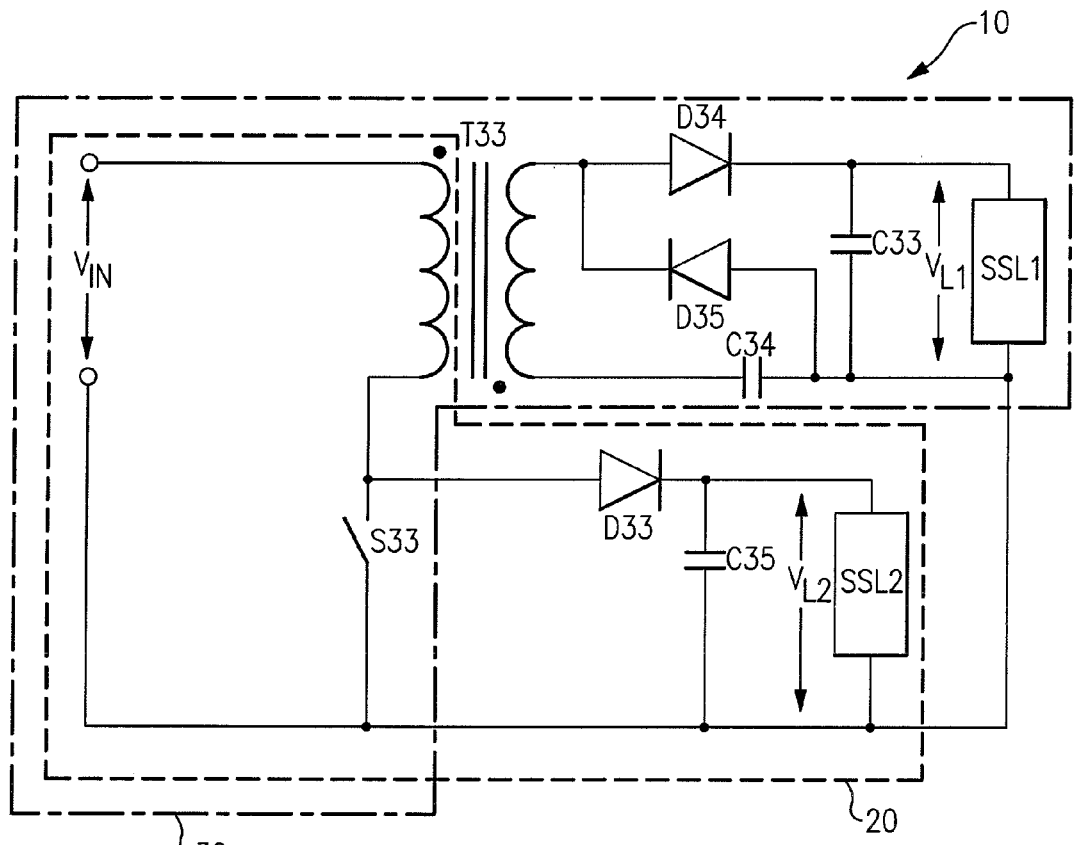
FIG. 3 is a schematic diagram of a boost/flyback power supply according to some embodiments of the present invention.

As seen in FIG. 3, in some embodiments of the present invention, a power supply 10 is provided that utilizes the inductive element of a boost converter 20 as the primary winding of a transformer of a flyback converter 30 to provide two voltage outputs ($V_{L1}$ and $V_{L2}$) of the power supply. In particular, an input voltage $V_{in}$ is provided to a primary winding of a transformer T33 through a switch S33. The switch may be a semiconductor switch, such as a transistor, for example, a MOSFET. A first terminal of the solid state lighting elements SSL2 is coupled to a node between the switch and the transformer's T33 primary winding by a diode D33. The second terminal of the solid state lighting elements SSL2 is coupled to a reference potential, such as ground. A capacitor C35 is coupled in parallel to the solid state light elements SSL2. The solid state lighting elements may be a string of solid state lighting elements, such as a string of LEDs. Thus the solid state lighting elements SSL2 are supplied power by the boost converter 20 comprising the primary winding of transformer T33, the switch S33, the diode D33 and the capacitor C35.

The voltage applied to the solid state lighting elements SSL2 ($V_{L2}$) will be based on the duty cycle of the switch S33 as discussed above. As will be appreciated by those of skill in the art in light of the present disclosure, the characteristics of the diode D33, the primary winding of the transformer T33 and the capacitor C35 may be selected based on the frequency and duty cycle of the switch.

The flyback converter 30 of FIG. 3 includes the primary and secondary windings of the transformer T33, the switch S33, the diode D34 and the capacitor C33. Optionally, the flyback converter may include the DC blocking capacitor C34 and the blocking diode D35. As is seen in FIG. 3, the primary winding of the transformer T33 is coupled to the switch S33 in the same manner as the boost converter 20 described above. The secondary winding of T33 is coupled to the solid state lighting elements SSL1 through the diode D34. The capacitor C33 is coupled in parallel to the solid state lighting elements SSL1.

The optional blocking capacitor C34 and blocking diode D35 may be provided to allow energy to be drawn from the primary winding of the transformer T33 during both the charging and discharging cycles. The optional capacitor C34 and diode D35 may be used to adjust the voltage away from that specified by the turn ratio of the transformer—such adjustment, however, might reduce the accuracy to which the load voltage can be regulated.

The solid state lighting elements SSL1 and SSL2 may include, for example, LEDs, organic LEDs or other solid state lighting devices. The different voltages applied to the solid state lighting elements may be selected based on the number of devices and/or the type of devices and their electrical configuration. For example, in some embodiments of the present invention, the solid state lighting elements may be serially connected strings of parallel connected LEDs. In other embodiments, the solid state lighting elements may be serially connected LEDs. The solid state lighting elements SSL1 and SSL2 may be the same or different colors and may contain different colors within the various strings. All of these variations in the composition of the solid state light emitting elements that provide the load of the power supplies 20 and 30 may benefit from different supplied voltages.

A variety of solid state light emitters are well-known. For example, one type of solid state light emitter is a light emitting diode. Any desired solid state light emitter or emitters can be employed in accordance with the present invention. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made). The respective light emitters can be similar to one another, different from one another, or any combination (i.e., there can be a plurality of solid state light emitters of one type, or one or more solid state light emitters of each of two or more types). Each such solid state light emitter can independently include (or not include) one or more luminescent materials, such materials, and their function in converting light of one wavelength into light of another wavelength, being well-known in the art.

Where more than one component is included in one or more of the loads to which power is supplied by the circuitry according to the present invention, the components, e.g., a plurality of solid state lighting elements can be wired in any suitable pattern. Preferably, the plurality of solid state light emitters are wired in a mesh pattern arranged in strings with conductive elements connecting the solid state light emitters in a particular string, and with one or more cross-connection conductive elements extending between the strings. Another example of a wiring pattern which can be used is series parallel, such that failure of one of the solid state light emitters would affect only solid state light emitters in series with the solid state light emitter that failed. The expression "series parallel", as used herein, means electrical paths are arranged in parallel, each electrical path including one or more solid state light emitters.

While embodiments of the present invention have been described with reference to a single flyback converter, multiple flyback converters for different operating voltages may also be provided. For example, a multi-tap secondary winding could be provided on transformer T33 to provide different turns ratios that provide different voltages for the flyback converters. The embodiments of the present invention should not be construed as limited to the specific configuration illustrated in FIG. 3.

Figure 4:
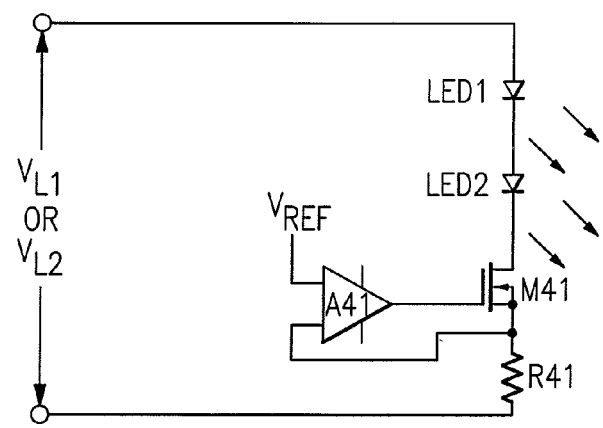
FIG. 4 is a schematic diagram of a low-side MOSFET current control according to further embodiments of the present invention.

FIG. 4 is a schematic diagram of a solid state light element load according to some embodiments of the present invention. The circuit of FIG. 4 provides current control through the solid state lighting elements without the need for high voltage control circuitry. In particular, a string of LEDs (LED1 and LED2), a MOSFET current control transistor M41 and a current sense resistor R41 are serially connected between a first reference potential and second reference potential. The first reference potential is greater than the second reference potential. For example, the first reference potential may be $V_{L1}$ or $V_{L2}$ and the second reference potential may be ground. Thus, the current control transistor M41 is on the "low side" of the LED string, between the LED string and ground. As such, the gate to source and gate to drain voltages may be relatively low voltages with reference to ground. Because the MOSFETs are on the low-sides of the LED strings, low voltage control circuitry may be employed to control operation of the MOSFETs.

The MOSFET M41 controls the current through the LED string by controlling the level of current that flows through the transistor M41. This level current control is in contrast to a pulse-width modulated system where the transistor acts as a switch.

FIG. 4 also includes a control circuit for the current control transistor M41. The operational amplifier A41 drives the gate voltage of the transistor M41. A reference voltage corresponding to a desired current level is provided as one input to the operational amplifier A41. The other input to the operational amplifier A41 is the voltage across the sense resistor R41. The operational amplifier A41 drives the gate of the transistor M41 such that the voltage across the sense resistor R41 equals the reference voltage. Thus, if the voltage across the sense resistor R41 is less than the reference voltage, the operational amplifier A41 will control the gate of the transistor M41 to increase the current through the transistor and, thereby, increase the voltage across the sense resistor R41.

While a particular control circuit is illustrated in FIG. 4, other control circuits may also be used with the low-side MOSFET control according to some embodiments of the present invention.

Figure 5:
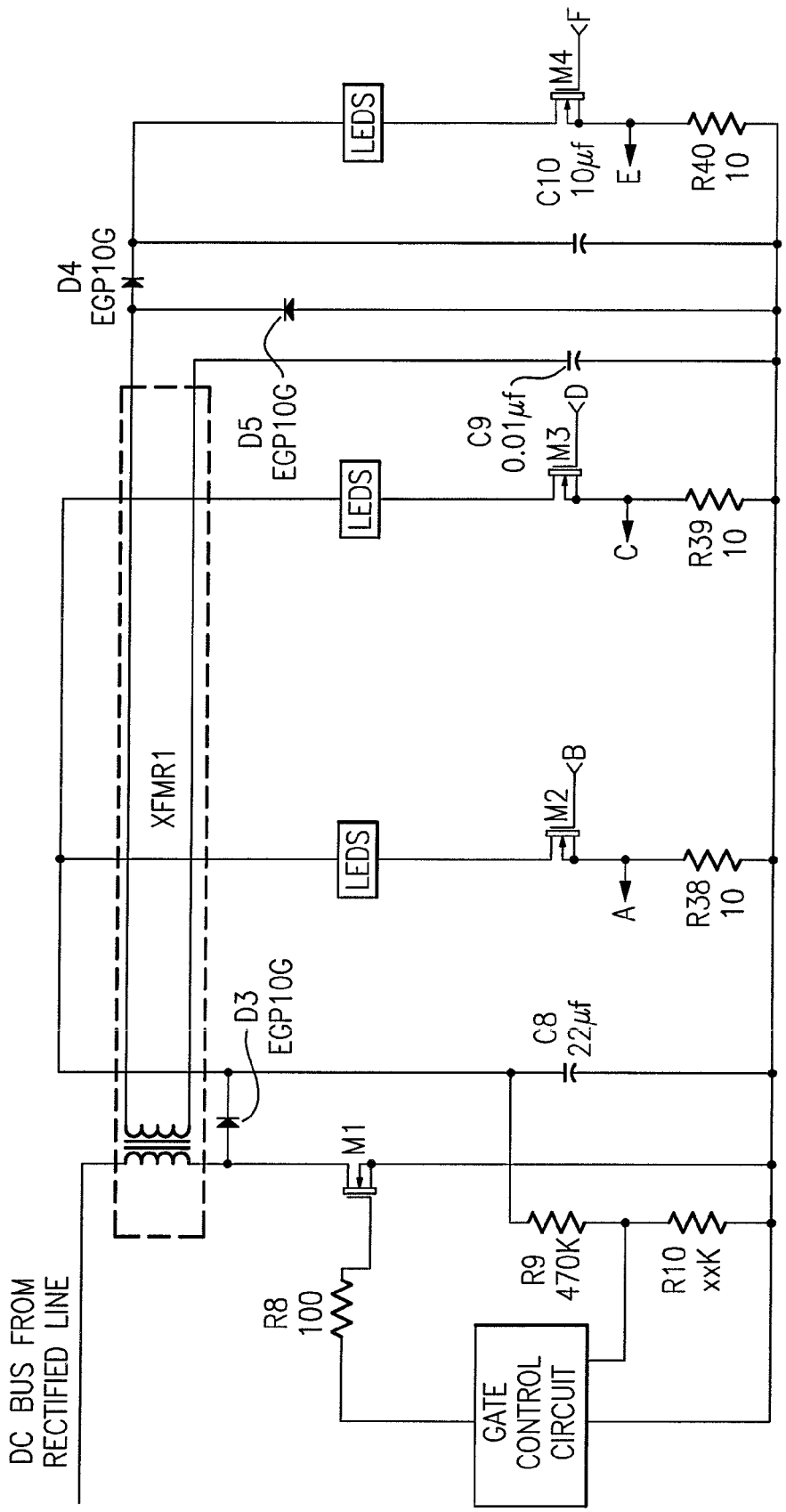
FIG. 5 is a schematic diagram of a boost/flyback power supply with low-side MOSFET current control according to some embodiments of the present invention.

An exemplary embodiment of a boost/flyback power supply with low-side MOSFET current control is illustrated in FIG. 5. In FIG. 5, the input voltage would be about 165 VDC, the switch provided by MOSFET M1 would be controlled by the Gate Control Circuit to switch at a frequency of about 50 kHz with a duty cycle that will depend upon the specific load being driven. The component values are as illustrated in FIG. 5 with R10 having a value selected to provide the voltage division needed to provide power to the gate control circuit. The gate controls of the MOSFETs reflected by inputs B, D and F can be the output of an operational amplifier, as illustrated in FIG. 4. The MOSFETs provide current regulation based on the voltage applied to the gate.

The devices of the present invention can be supplied with electricity in any desired manner. Skilled artisans are familiar with a wide variety of power supplying apparatuses, and any such apparatuses can be employed in connection with the present invention. The lighting devices of the present invention can be electrically connected (or selectively connected) to any desired power source, persons of skill in the art being familiar with a variety of such power sources.

Furthermore, while certain embodiments of the present invention have been illustrated with reference to specific combinations of elements, various other combinations may also be provided without departing from the teachings of the present invention. Thus, the present invention should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

Any two or more structural parts of the devices described herein can be integrated. Any structural part of the devices described herein can be provided in two or more parts (which are held together, if necessary). Similarly, any two or more functions can be conducted simultaneously, and/or any function can be conducted in a series of steps.

The invention claimed is:

1. A power supply, comprising:
a boost converter configured to provide a voltage higher than an input voltage to a first load; and
a flyback converter configured to provide a voltage to a second load, the flyback converter utilizing an inductive element of the boost converter as a primary winding of a transformer of the flyback converter
the inductive element of the boost converter coupled to the input voltage, the flyback converter comprising:
 a secondary winding configured to be coupled to the primary winding;
 a second diode coupled between the secondary winding and a second string of light emitting elements;
 a sub-circuit connected in series with the second diode, the sub-circuit comprising a first capacitive element and the second string of light emitting elements in parallel; and
 a second capacitive element connected in series with the second diode and the sub-circuit.

2. The power supply of claim 1, wherein the boost converter further comprises:
 a first diode coupled between the inductive element and a first string of light emitting elements; and
 a switching element coupled between the inductive element and a reference voltage.

3. The power supply of claim 2, further comprising a control circuit configured to control the switching element to provide a predefined frequency and duty cycle with which the switching element is opened and closed.

4. The power supply of claim 1, wherein at least one of said first load and said second load comprises a string of light emitting elements.

5. The power supply of claim 4, wherein at least one of said light emitting elements comprises a solid state light emitter.

6. The power supply of claim 1, wherein said first load and said second load each comprise a string of light emitting elements.

7. A circuit for supplying power, comprising:
 at least a first transformer, the first transformer comprising a primary winding and a secondary winding;
 a first circuit portion; and
 a second circuit portion,
 the first circuit portion comprising the primary winding of the first transformer, at least a first switch and a first sub-circuit, the first switch and the first sub-circuit arranged in parallel,
  the first sub-circuit comprising at least a first diode and a second sub-circuit, the first diode and the second sub-circuit arranged in series,
   the second sub-circuit comprising at least a first capacitor and at least a first load arranged in parallel,
 the second circuit portion comprising the secondary winding of the first transformer, at least a second diode, a third sub-circuit and a third capacitor, the second diode and the third sub-circuit arranged in series,
  the third sub-circuit comprising at least a second capacitor and at least a second load arranged in parallel,
  the third capacitor electrically connected between a cathode end of the third sub-circuit and the secondary winding of the first transformer.

8. The circuit of claim 7, wherein the second sub-circuit is electrically connected to a cathode end of the first diode.

9. The circuit of claim 7, wherein the third sub-circuit is electrically connected to a cathode end of the second diode.

10. The circuit of claim 7, wherein the first switch is a MOSFET.

11. The circuit of claim 10, wherein the MOSFET is configured to control the level of current flowing through at least a first string of light emitting elements.

12. The circuit of claim 7, wherein voltage applied to the first load is based on a duty cycle of the first switch.

13. The circuit of claim 7, wherein at least one of the first load and the second load comprises at least a first solid state light emitting element.

14. The circuit of claim 13, wherein the first solid state light emitting element is an LED.

15. The circuit of claim 7, wherein a first voltage supplied to the first load differs from a second voltage supplied to the second load.

16. The circuit of claim 15, wherein the first voltage is applied to the first load during at least a portion of a time that the second voltage is applied to the second load.

17. A circuit for supplying power, comprising:
 at least a first transformer, the first transformer comprising a primary winding and a secondary winding;
 a first circuit portion; and
 a second circuit portion,
 the first circuit portion comprising the primary winding of the first transformer, at least a first switch and a first sub-circuit, the first switch and the first sub-circuit arranged in parallel,
  the first sub-circuit comprising at least a first diode and a second sub-circuit, the first diode and the second sub-circuit arranged in series,
   the second sub-circuit comprising at least a first capacitor and at least a first load arranged in parallel,
 the second circuit portion comprising the secondary winding of the first transformer, at least a second diode, a third sub-circuit and a third diode, the second diode and the third sub-circuit arranged in series,
  the third sub-circuit comprising at least a second capacitor and at least a second load arranged in parallel,
  the third diode electrically connected between a first node and a second node, the first node between a first end of the secondary winding of the first transformer and the anode end of the second diode, the second node between the cathode end of the third sub-circuit and a second end of the secondary winding of the first transformer.

18. The circuit of claim 17, wherein the third capacitor electrically connected between the second end of the secondary winding of the first transformer and a node which is electrically connected to a cathode end of the third sub-circuit and to a cathode end of the third diode.

19. A circuit for supplying power, comprising:
 at least a first transformer, the first transformer comprising a primary winding and a secondary winding;
 a first circuit portion; and
 a second circuit portion,
 the first circuit portion comprising the primary winding of the first transformer, at least a first switch and a first sub-circuit, the first switch and the first sub-circuit arranged in parallel,
  the first sub-circuit comprising at least a first diode and a second sub-circuit, the first diode and the second sub-circuit arranged in series,
   the second sub-circuit comprising at least a first capacitor and at least a first load arranged in parallel,
 the second circuit portion comprising the secondary winding of the first transformer, at least a second diode and a third sub-circuit, the second diode and the third sub-circuit arranged in series,
  the third sub-circuit comprising at least a second capacitor and at least a second load arranged in parallel,
 wherein:

at least one of the first load and the second load comprises at least a first solid state light emitting element, at least a first transistor, at least a first resistor and at least a first operational amplifier, the first solid state light emitting element, the first transistor, and the first resistor are arranged in series, a cathode end of the first solid state light emitting element is electrically connected to a source of the first transistor, the first resistor is electrically connected to a collector of the first transistor, and the operational amplifier drives a gate voltage of the first transistor, a reference voltage is provided as a first input to the operation amplifier and a voltage from a node between the collector of the first transistor and the first resistor is a second input to the operational amplifier.

* * * * *

UNITED STATES PATENT AND TRADEMARK OFFICE
CERTIFICATE OF CORRECTION

PATENT NO. : 8,283,904 B2  Page 1 of 1
APPLICATION NO. : 11/854744
DATED : October 9, 2012
INVENTOR(S) : Peter Jay Myers It is certified that error appears in the above-identified patent and that said Letters Patent is hereby corrected as shown below:

<u>Column 11, Line 6</u>

(claim 19), line 28: please change "arc" to --are--.

Signed and Sealed this
Twenty-fifth Day of December, 2012

David J. Kappos
*Director of the United States Patent and Trademark Office*